United States Patent [19]

Itoh

[11] Patent Number: 4,914,407

[45] Date of Patent: Apr. 3, 1990

[54] CROSSTIE OVERLAY SLOW-WAVE STRUCTURE AND COMPONENTS MADE THEREOF FOR MONOLITHIC INTEGRATED CIRCUITS AND OPTICAL MODULATORS

[75] Inventor: Tatsuo Itoh, Austin, Tex.

[73] Assignee: Board of Regents, University of Texas System, Austin, Tex.

[21] Appl. No.: 203,330

[22] Filed: Jun. 7, 1988

[51] Int. Cl.$^4$ ............................................. H01P 1/18
[52] U.S. Cl. .................................... 333/161; 333/156; 331/107 SL
[58] Field of Search ............... 333/156, 157, 161, 162, 333/164, 246, 238; 350/355; 331/107 G, 107 SL

[56] References Cited

U.S. PATENT DOCUMENTS

| | | | |
|---|---|---|---|
| 3,308,336 | 3/1967 | McDowell | 315/39.69 |
| 3,434,725 | 12/1969 | Sobotka | 333/31 |
| 3,621,462 | 11/1971 | Hammer et al. | 333/156 X |
| 3,875,538 | 4/1975 | Minet et al. | 333/73 S |
| 4,340,873 | 7/1982 | Bastida | 333/161 |
| 4,630,011 | 12/1986 | Neidert et al. | 333/164 |
| 4,695,812 | 9/1987 | Kameya | 333/156 |

OTHER PUBLICATIONS

Seki and Hasegawa, "Cross-Tie Slow-Wave Copolanar Waveguide on Semi-Insulating GaAs Substrates", Electronics Letters, Dec. 10, 1981, vol. 17, No. 25, pp. 940-941.

Bastida and Denzelli, "Periodic Slow-Wave Low-Loss Structures for Monolithic GaAs Microwave Integrated Circuits", Electronics Letters, 13th Sep. 1979, vol. 15, No. 19, pp. 581-582.

Tsuang and Itoh, "Finite Element Analysis of Slow-Wave Schottky Contact Printed Lines", IEEE Transactions on Microwave Theory and Techniques, vol. MTT-34, No. 12, Dec. 1986.

Ikalainen et al., "Dielectric Waveguide Band-Pass Filters With Broad Stop Bands", 1985 IEEE MTT-S Digest, pp. 277-280.

Itoh, "Spectral Domain Immitance Approach for Dispersion Characteristics of Generalized Printed Transmission Lines", IEEE Transactions on Microwave Microwave Theory and Techniques, vol. MTT-28, No. 7, Jul. 1980, pp. 733-736.

Song and Itoh, "Distributed Bragg Reflection Dielectgric Waveguide Oscillators", IEEE Transactions on Microwave Theory and Techniques, vol. MTT-27, No. 12, Dec. 1979, pp. 1019-1022.

Itoh, "Application of Gratings in a Dielectric Waveguide for Leaky-Wave Antennas and Band-Reject Filters", IEEE Transactions on Microwave Theory and Techniques, vol. MTT-27, No. 12, Dec. 1979, pp. 1134-1138.

Atsuki and Yamashita, "Transmission Line Aspects of the Design of Broad-Band Electrooptic Travelin- (List continued on next page.)

*Primary Examiner*—Eugene R. Laroche
*Assistant Examiner*—Seung Ham
*Attorney, Agent, or Firm*—Arnold, White & Durkee

[57] ABSTRACT

A slow-wave structure for monolithic microwave circuits has a microstrip or coplanar waveguide disposed on a semiconductor substrate that is all covered with a dielectric layer, and aligned on top of this layer is an array of spaced crosstie strips aligned transversed to the microstrip or coplanar waveguide. The wavelength of a microwave signal on the microstrip or coplanar waveguide is then from about one and one-half to one twentieth of its free space wavelength due to the slow-wave effect. The slow-wave structure facilitates coupling of the propagating microwave signal with semicondutor structures such as a Schottky junction with a doped layer to provide electronic tuning of the slow-wave factor or to provide electro-optical modulation of a light beam confined in an optical channel waveguide. To provide stop band filters or resonators, the crossties are preferably arranged in a doubly-periodic structure having a first period much less than the wave length in the slow-wave structure at the operating frequency and a second period of about ½ to ¼ of the wavelength of the microwave signal in the slow-wave structure.

20 Claims, 7 Drawing Sheets

OTHER PUBLICATIONS g-Wave Modulators", Journal of Lightwave Technology, vol. LT-5, No. 3, Mar. 1987.

Saito and Ito, "Buried-Heterostructure AlGaAs Lasers", IEEE Journal of Quantum Electronics, vol. QE-16, No. 2, Feb. 1980, pp. 205–215.

Marcatili, "Dielectric Rectangular Waveguide and Directional Coupler for Integrated Optics," The Bell System Technical Journal, Sep. 1969, pp. 2071–2102.

Alferness, "Waveguide Electrooptic Modulators," IEEE Transactions on Microwave Theory and Techniques, vol. MTT-30, No. 8, Aug. 1982, pp. 1121–1137.

Marcuse, "Optimal Electrode Design for Integrated Optics Modulators," IEEE Journal of Quantum Electrons vol. QE-18, No. 3, Mar. 1982, pp. 393–1457.

Chen, "Modulators for Optical Communications, " Proceedings of the IEEE, vol. 58, No. 10, Oct. 1970.

Kaminow and Liu, "Propagation Characteristics of Partially Loaded Two-Conductor Transmission Line for Broadband Light Modulators," Proceedings of the IEEE, vol. 51, Jan. 1963.

Higgins, "Microwave GAAs FET Monolithic Circuits," 1979 IEEE International Solid-State Circuits Conference, pp. 120–121.

T. H. Wang and T. Itoh, "Compact Grating Structure for Applications to Filters and Resonators for Monolithic Microwave Integrated Circuits," 1987 IEEE MTT-S International Microwave Symposium Digest, Las Vegas, NV, Jun. 9–11, 1987.

T. H. Wang and T. Itoh, "Compact Grating Structures for Applications to Filters and Resonators in Monolithic Microwave Integrated Circuits," IEEE Trans. Microwave Theory and Techniques, vol. MTT-35, Dec. 1987.

"Crosstie Overlay Slow-Wave Structures for Broadband Electro-Optical Traveling Wave Modulators," International Journal of Infrared and Millimeter Waves, vol. 9, No. 7, Jan. 1988.

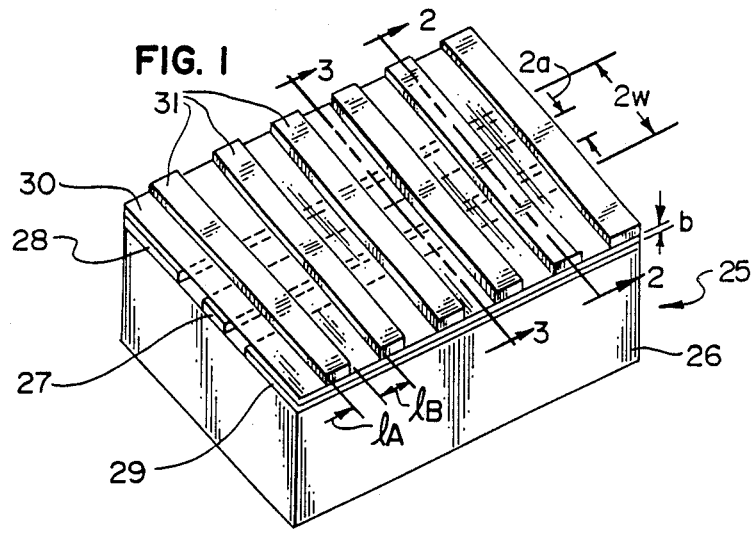
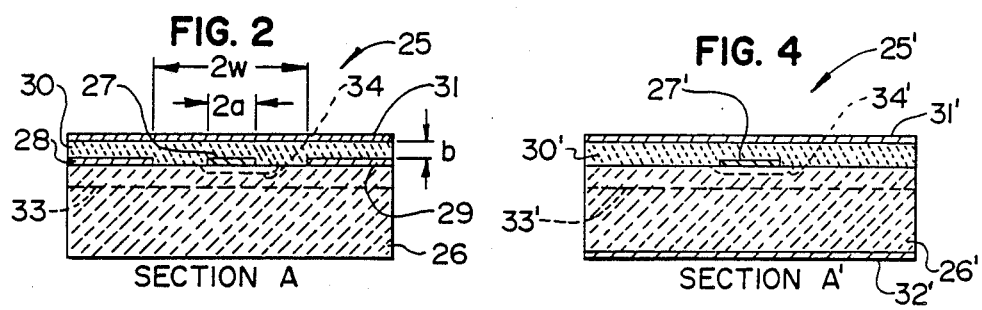
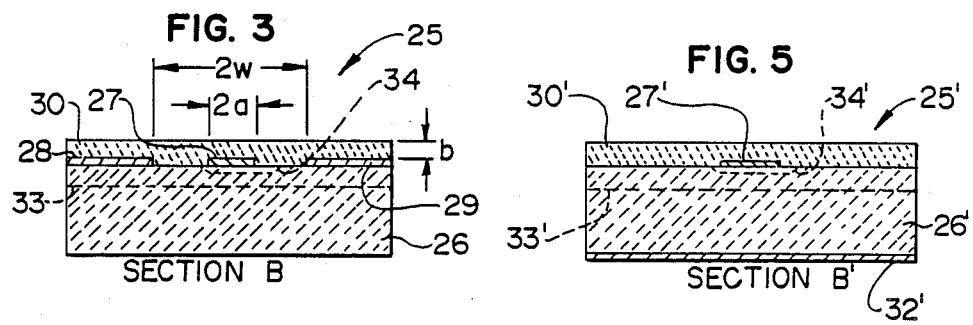

CROSSTIE OVERLAY SLOW-WAVE STRUCTURE AND COMPONENTS MADE THEREOF FOR MONOLITHIC INTEGRATED CIRCUITS AND OPTICAL MODULATORS

The United States Government may have rights in this invention pursuant to funding arrangements with the Department of Defense.

BACKGROUND OF THE INVENTION

1. Field of the Invention

The present invention relates to a slow-wave structure for monolithic microwave integrated circuits.

2. Description of Related Art

Various kinds of microwave circuits, such as filters and couplers, require a transmission line having a length on the order of a wavelength at an operating frequency. This is particularly true for providing wideband and high-Q components that have a phase shift that is a linear function of frequency. Conventional transmission lines, however, have wavelengths that are too long compared to the desired physical dimensions of integrated circuits. In other cases, such as optical modulators, the electrical wavelength of the conventional transmission line is too long compared to the modulation wavelength of an optical, acoustic or other kind of wave to be coupled to the electromagnetic wave propagating on the transmission line.

In order to shorten the electrical wavelength of a transmission line, it is known to provide a periodic variation in the inductance or capacitance of the line so as to form a "slow-wave" structure. The slow-wave structure functions like a transmission line so long as the variations are spaced at a distance much smaller than electrical wavelength. The period variation increases the inductance or capacitance per unit length of the line and thereby decreases the phase velocity of the electromagnetic wave, which is inversely proportional to the square root of the product of the inductance and capacitance per unit length. It is also known that the periodic variations in inductance and capacitance can be chosen to select the impedance of the slow-wave structure, which is proportional to the square root of the ratio of the inductance per unit length to the capacitance per unit length.

A slow-wave structure for monolithic GaAs microwave integrated circuits is disclosed in Bastida U.S. Pat. No. 4,340,873 and his article "Periodic Slow-Wave, Low-Loss Structures For Monolithic GaAs Microwave Integrated Circuits," *Electronics Letters*, 13th September 1979, Vol. 15, No. 19, pp. 581–582. The slow-wave structures include stripline waveguides periodically shunted by high-Q overlap capacitors. In FIGS. 1 to 5, the Bastida patent shows a substrate of semi-insulating semiconductor material (GaAs) upon which are disposed two parallel conducting bands connected together by transverse strips spaced apart at distances less than the signal wavelength. A strip of dielectric material such as silicon dioxide is disposed on top of and perpendicular to the transverse strips. Finally, a conducting strip is disposed on top of the insulating material. As shown in FIG. 2 of the *Electronics Letters* article, the conducting strip 5 itself can be a periodic structure to enhance the slow-wave effect.

Another slow-wave structure for monolithic GaAs microwave integrated circuits is disclosed in Seki & Hasegawa, "Cross-tie Slow-wave Coplanar Wageguide on Semi-insulating GaAs Substrates," *Electronic Letters*, 10th December 1981, Vol. 17, No. 25, pp. 940–941. Seki & Hasegawa propose a coplanar waveguide slow-wave structure built on a semi-insulating GaAs substrate and having spaced apart crossties made of conducting material. The crossties are formed directly on the semi-insulating GaAs substrate. Then a dielectric layer is disposed on the crossties. Finally, the coplanar waveguide is disposed on the dielectric layer.

Slow-wave propagation also occurs along a microstrip transmission line disposed over and forming a Schottky junction with a semiconductor medium. The slow-wave effect occurs due to different partitioning of the magnetic and electric field energy between the Schottky depletion layer and the semiconductor layer. As disclosed in Neidert, et al., U.S. Pat. No. 4,630,011, a variable phase shift can be obtained by biasing the Schottky junction so as to vary the thickness of the depletion layer.

SUMMARY OF THE INVENTION

Other objects and advantages of the invention will become apparent upon reading the following detailed description and upon reference to the drawings in which:

The primary object of the invention is to provide a slow-wave structure for monolithic microwave integrated circuits that is better adapted to integrated circuit fabrication methods and a wider range of functions to be performed.

Another object is to provide a slow-wave structure for monolithic microwave integrated circuits that permits improved coupling to a semiconductor substrate where such coupling is described, yet has a low loss when coupling is unnecessary.

Still another object of the invention is to provide a low noise microwave oscillator that is electronically tuneable.

And yet another object of the invention is to provide a monolithic semiconductor optical phase modulator.

Briefly, in accordance the invention, the slow-wave structure includes an elongated conductive strip disposed on a semiconducting substrate. The conductive strip functions as a transmission line in a coplanar waveguide (CPW) or microstrip line (MS) arrangement. An insulating layer is deposited over the conductive strip and the semiconducting substrate. A plurality of conductive crosstie strips are disposed on the insulating layer and aligned over and transverse to the elongated conductive strip. The wavelength of a microwave signal on the elongated strip is from one half to one-twentieth of its free space wavelength due to the slow-wave effect.

For most applications, the period between the crossties is preferably much smaller than the guide wavelength at the operating frequency, with the result that the slow-wave structure can be modeled as a uniform transmission line having a relatively low velocity of propagation compared to the velocity of propagation for a coplanar waveguide (CPW) or microstrip line (MS).

The decrease in wavelength (i.e., the slow-wave factor) can be adjusted by a number of structure parameters, such as the permitivity of the dielectric layer, the cross-sectional dimensions of the waveguide structure, and the period and duty factor of the crosstie strips.

The slow-wave structure of the invention is particularly advantageous for fabricating microwave filters and resonators. Since the elongated strip conveying the microwave signal is disposed on the semiconductor substrate, a Schottky junction between the elongated strip and the substrate readily provides an electronic tuning effect that need not appreciably reduce the quality factor (Q) of the filter or resonator. This is a consequence of the fact that the tuning mechanism is distributed throughout the filer or resonator.

The preferred form of the filter or resonator is a doubly-periodic grating in which the spacing between the crosstie strips is itself a periodic function having a period of about one-half to one-quarter of the guide wavelength. This permits the structure to be readily tailored or weighted to provide a selected frequency response.

The slow-wave structure of the invention is also particularly advantageous for constructing a monolithic semiconductor optical phase modulator. The slow-wave structure of the invention permits matching of the optical phase velocity in the semiconductor to the electromagnetic phase velocity of the slow-wave structure. The design parameters also permit the slow-wave structure to have a standard impedance such as 50 ohms. Dispersion of the optical signal is prevented by an optical waveguide formed as a buried gallium aluminum arsenide channel in a gallium arsenide structure.

BRIEF DESCRIPTION OF THE DRAWINGS

Other objects and advantages of the invention will become apparent from the following detailed description and upon reference to the drawings in which:

FIG. 1 is a schematic diagram of a monolithic microwave slow-wave structure in accordance with the present invention;

FIG. 2 is a cross-section of the slow-wave structure along line 2—2 of FIG. 1;

FIG. 3 is a cross-section of the slow-wave structure along line 3—3 of FIG. 1;

FIG. 4 is a cross-section corresponding to FIG. 2 but showing an alternative embodiment using a microstrip line instead of a co-planer waveguide;

FIG. 5 is a cross-section corresponding to FIG. 3 but showing alternative embodiment using the microstrip line;

DETAILED DESCRIPTION OF THE PREFERRED EMBODIMENTS

Figure 6:
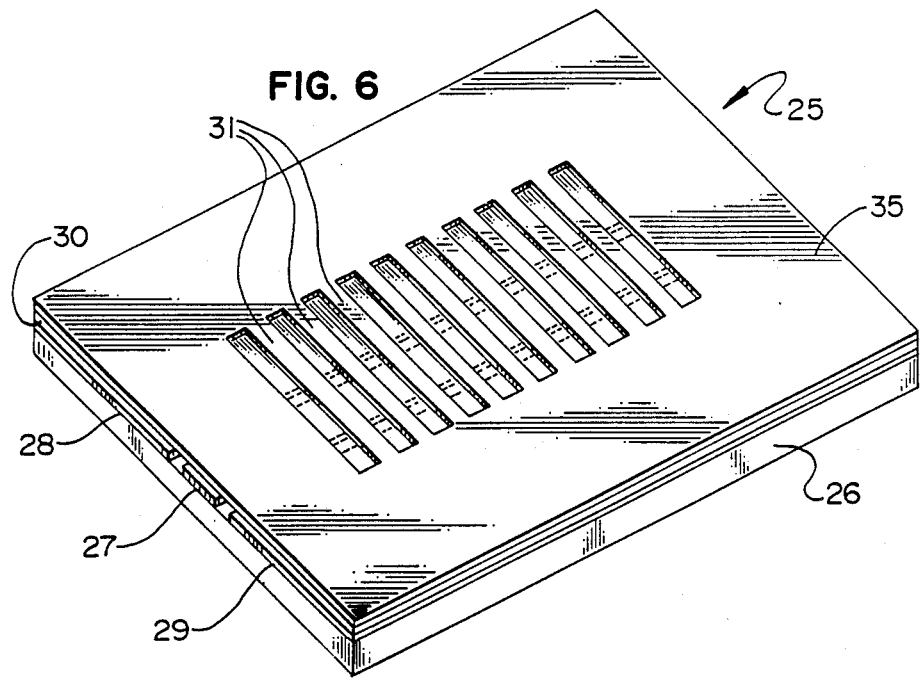
FIG. 6 shows one way of fabricating crosstie strips in the slow-wave structure of FIG. 1.

Turning now to the drawings, there is shown in FIG. 1 a schematic diagram of a monolithic microwave slow-wave structure generally designated 25 in accordance with the present invention. In order to provide a mechanical base and also to provide a source of semiconductor for building integrated circuit elements, the slow-wave structure 25 includes a substrate 26 of semiconductor material. Preferably the substrate 26 is made of semi-insulating gallium arsenide having a resistivity of about $7 \times 10^7$ ohms-cm, and a thickness of about 500 microns. On the upper surface of the substrate 26 there is disposed an elongated conductive strip 27 which functions as a transmission line in a coplanar waveguide further including guard strips 28 and 29 which are spaced along side the elongated strip 27. On top of the strips 27, 28, 29 and convering the substrate 26 there is deposited an insulating layer 30 that serves as a dielectric for the coplanar waveguide. The dielectric is, for example, a layer of silicon nitride ($Si_3N_4$) or silicon dioxide ($SiO_2$). Silicon nitride is preferred due to its high dielectric constant ($e_r = 6.8$) and its high dielectric strength.

If the coplanar waveguide were closed on top by a ground plane, then the velocity of propagation for a signal on the elongated strip 27 would be somewhat smaller than the velocity of light in free space, due to the relative dielectric constant of the insulating layer 30 and also due to the dielectric constant of the semi-insulating gallium arsenide substrate 26. Semi-insulating gallium arsenide has a relative dielectric constant of about 12.9, so that the mean dielectric constant seen by the propagating signal would be approximately 9 and therefore the velocity of propagation would be about three times slower than the velocity of light in free space. This would reduce the wavelength of the signal propagating on the elongated strip 27 by a factor of about three compared to the wavelength in free space. This reduction, however, still does not provide a sufficiently small size for fabricating many desirable transmission line components on the monolithic substrate 26. In addition, to construct components such as an optical phase modulator, it is required that the group velocity of the modulating signal propagating on the elongated strip 27 be precisely matched to the velocity of light through the substrate 26 over a relatively wide modulation signal bandwidth. Therefore, for these applications it is desireable to provide some kind of means for further reducing the velocity of propagation and therefore the wavelength of microwave signals propagating on the elongated strip 27. This can be done with a slow-wave structure.

As shown in FIG. 1, the coplanar waveguide is provided with a periodic array of crosstie strips 31 that are disposed on top of the insulating layer 30 and are aligned transverse to the elongated strip 27. As shown in FIG. 1, the strips 31 substantially overlap the guard strips 28, 29 and therefore it will be assumed for the purposes of further discussion that the ends of the strips 31, as well as the guard strips 28 and 29, are at ground potential due to the substantial capacitive coupling of the crosstie strips to the guard strips. Therefore, the length of the crosstie strips 31 is assumed to have a negligible effect upon the operation of the slow-wave structure 25.

The crosstie strips 31 cause a slow-wave effect due to a spatial separation of the electric and magnetic energy associated with the microwave signal propagating along the elongated strip 27. Shown in FIG. 2, for example, is a cross-section normal to the direction of propagation and including a crosstie strip 31. Shown in FIG. 3 is a cross-section of the slow-wave structure 25 at a location where a crosstie strip is absent. In the section of FIG. 2 including the crosstie strip 31, the capacitance seen by a section of the elongated strip 27 is substantially increased in comparison to the capacitance seen in the section of FIG. 3. Also, due to the absence of the crosstie strip from the cross-section in FIG. 3, the inductance seen by the strip 27 is somewhat increased in comparison to the inductance seen by the strip 27 in the section in FIG. 2. This spatial separation of electric and magnetic energy causes the slow-wave effect.

Considering the elongated strip 27 as a transmission line, the effective capacitance (C) and inductance (L) of the transmission line can be increased independently by a spatial separation of electric and magnetic energies into the two different sections. The shunt capacitance and series inductance in the equivalent circuit of the transmission line corresponds to the effective capacitance and inductance in the respective sections. Therefore, the propagation constant (B), which is proportional to square root of the product LC, can be increased above that of the common coplanar waveguide. The section in FIG. 2, which will be designated section A, for example, may have a normalized propagation constant (i.e., slow-wave factor) of 2.1. The section in FIG. 3, designated section B, may have a slow-wave factor of 2.5. The slow-wave factor for the entire structure, however, will in this case have a slow-wave factor of about 11.

In any specific case the slow-wave factor for the structure 25 is a function of a number of parameters including most importantly the spacing b of the insulating layer 30 between the strips 27, 28, 29, and the crossties 31, to a lesser extent the parameters a and w defining respectively the half width of the elongated strip 27 and the spacing between the guard strips 28, 29, and the lengths $l_A$ and $l_B$ of section A and section B, respectively.

A very precise numerical analysis of the slow-wave structure can be performed using standard spectrum domain analysis as disclosed in T. Itoh, I.E.E.E. Transactions on Microwave Theory and Techniques, Vol. MTT-28 No. 7, July 1980, pp. 733–736.

If the lengths $l_A$ and $l_B$ are small compared to the resulting wavelength in the slow-wave structure, and if the impedance of section A ($Z_A$) is much smaller than the impedance of section B ($Z_B$) electric energy is mainly stored in section A and magnetic energy is mainly stored in section B, resulting in spatially separated energy storage. In this case, the slow-wave structure can be analyzed by applying Floquet's theorm which assumes that the transmission line is an infinite series of sections A and B, and also by requiring current and voltage continuity at each junction between the sections. Under these assumptions one obtains the following dispersion equation and equation for the complex impedance;

$$\cos(\gamma 1) = \cos(\gamma_A l_A)\cos(\gamma_B l_B) - $$
$$(1/2)(Z_A/Z_B + Z_B/Z_A)\sin(\gamma_A l_A)\sin(\gamma_B l_B)$$

$$Z = \left( \frac{Z_A \sin(\gamma_A l_A)\cos(\gamma_B l_B) + Z_B \cos(\gamma_A l_A)\sin(\gamma_B l_B)}{(1/Z_A)\sin(\gamma_A l_A)\cos(\gamma_B l_B) + (1/Z_B)\cos(\gamma_A l_A)\sin(\gamma_B l_B)} \right)^{1/2}$$

where $\gamma, Z$ = overall complex propagation constant and characteristic impedance $\gamma_A, \gamma_B$ = complex propagation constant of Sections A and B, respectively $Z_A, Z_B$ = characteristic impedances of Sections A and B, respectively $l = l_A + l_B$, with 1A and 1B being the lengths of Sections A and B, respectively Assuming for simplicity that $Y_A l_A, Y_B l_B \ll 1$, $Y_A = Y_B$ and $Z_A \ll Z_B$ the above equations can be reduced to the following simple expressions $$(1 + T)\beta = \beta_A (1 + TK + T^2)^{1/2}$$
$$(1 + T)^2 \alpha = (\beta_A/\beta)[\alpha_A + T^2\alpha_B + KT(\alpha_A + \alpha_B)/2]$$
$$Z = [Z_A Z_B TK/(K + T)]^{1/2}$$

Since B and Z are approximately proportional to $\sqrt{Z_B/Z_A}$ and $\sqrt{Z_A Z_B}$ respectively, in the event of $1 \ll Z_B/Z_A$ and $l_A \approx l_B$, the propagation constant can easily be increased while maintaining a given characteristic impedance. Therefore, this property can be applied very effectively in order to achieve the simultaneous matching of the phase and the impedance, that is required in the optimum electrode design of traveling-wave optical modulators. Furthermore, since this slow-wave structure is almost dispersionless due to the uniform transmission line behavior, the structure is very useful for the design of wideband filters and traveling-wave optical modulators.

Turning to FIGS. 4 and 5, there are shown cross-sections for an alternative construction in which like components are designated with similar reference numerals which are primed. This alternative construction uses a microstrip configuration about an elongated conductive strip 27'. In the microstrip slow-wave structure 25', a conductive ground plane 32' is deposited on the lower surface of the substrate 26' in lieu of the guard strips 28 and 29 used in the coplanar waveguide configuration 25.

Although the substrate 26 is preferably semi-insulating gallium arsenide, it is desirable in some cases to dope the top portion of the substrate 26, for example, to the level 33 shown in FIGS. 2 and 3 or the level 33' shown in FIGS. 4 and 5. This doping could be provided by ion implantation, for example, or epitaxial deposition. This doped layer, for example, extends 2 microns from the upper surface of the substrate and has an n-type impurity density of $1 \times 10^{17}$ per $cm^3$. This level of doping is useful for providing a Schottky junction between the elongated strip 27 or 27'. This Schottky junction has a depletion region delimited by the dashed line 34 or 34' and the extent of this displetion region can be increased or decreased by the application of a bias voltage to the strip 27 with respect to the guard strips 28 or 29, or the ground plane layer 32'. In these cases the strips 27, 28, 29 or 27', 32' are deposited in such a way as to form Schottky junctions with the elongated strips 27 and 27' and to form ohmic junctions with the guard strips 28, 29 or the ground plane layer 32'. Techniques for forming such junctions are described in Neidert et al. U.S. Pat. No. 4,630,011 issued Dec. 16, 1986.

Figure 7:
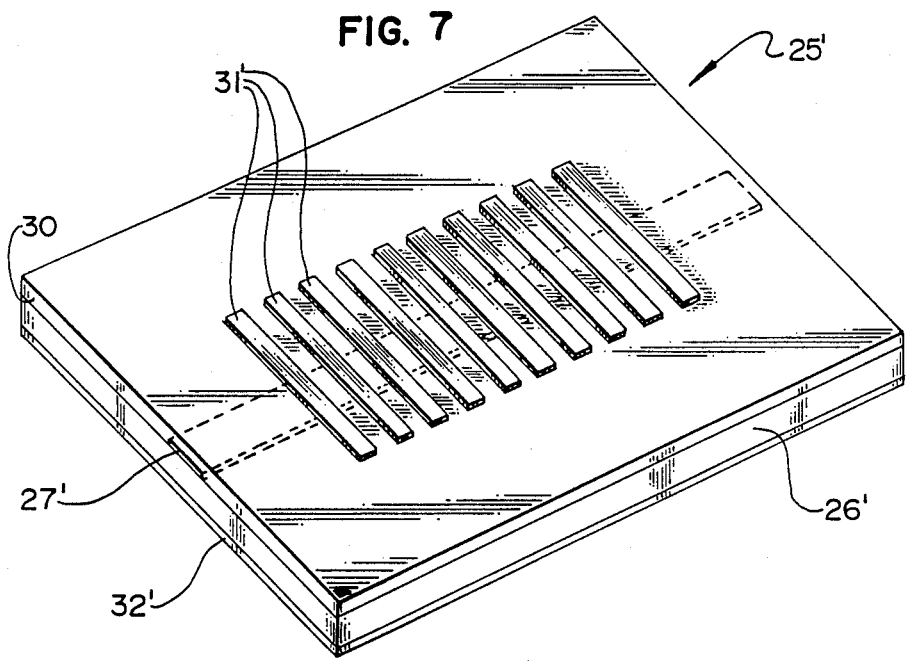
FIG. 7 shows an alternative way of fabricating the crosstie strips.

Turning now to FIGS. 6 and 7 there are shown two alternative ways for forming the crosstie strips 31 or 31'. In FIG. 6, the crosstie strips 31 are intergrally formed as part of an upper ground plane layer 35. In FIG. 7, the crosstie strips 31' are shown formed as separate individual strips.

Although the technique of using an upper ground plane 35 is used in FIG. 6 for forming the crosstie strips 31 for the coplanar waveguide configuration, an upper ground plane could be used for providing the crosstie strips for the microstrip configuration. Similarly, the crosstie strips 31 for the coplanar waveguide configuration could be individually formed.

Figure 8:
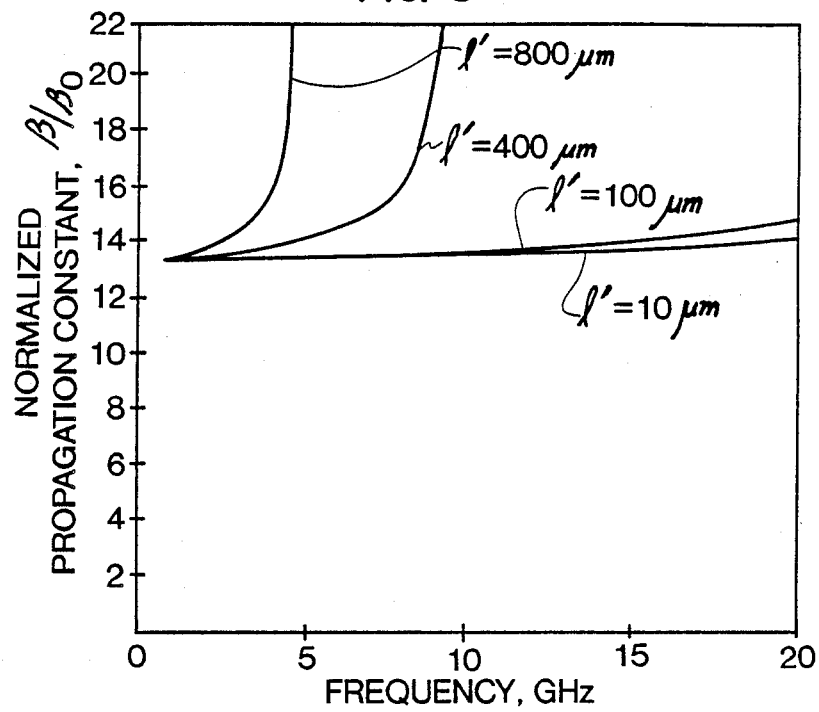
FIG. 8 is a graph of the normalized propagation constant for the slow-wave structure of FIG. 1 for various frequencies and spacings between the crosstie strips.

Turning now to FIG. 8, there is shown a graph of the normalized propagation constant (i.e., the slow-wave factor) as a function of frequency that has been calculated for a proposed slow-wave structure. In this proposed structure, the parameter a is 150 microns, the parameter w is 745 microns, the parameter b is 1.0 microns and the dielectric constant $e_r$ is 6.5. The dispersion relationship between the slow-wave factor and frequency is plotted for four different values of $l_A = l_B = l'$. As the frequency is increased, the graph in each case becomes dispersive which is caused by a stop band phenomena. This stop band phenomena occurs when the offset between the crosstie strips becomes equal to half the wavelength for a signal propogating through the slow-wave structure. Therefore, the dispersion is very pronounced at the lower frequencies when the length l is relatively large. When l' is relatively small, as in the case of l = 10 microns, the slow-wave structure is essentially nondispersive over the range of 0 to about 40 or 50 gigahertz.

Figure 9:
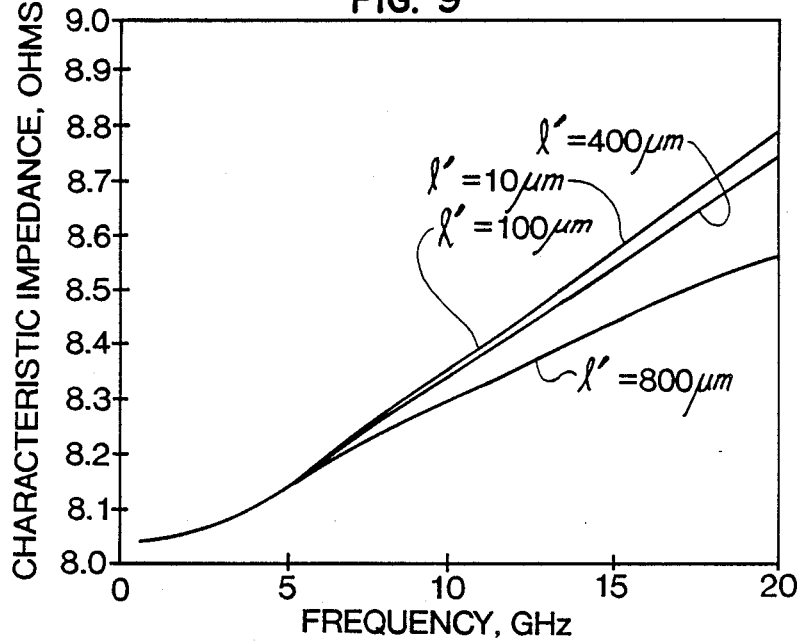
FIG. 9 is a graph of the characteristic impedance of the slow-wave structure of FIG. 1 for various frequencies and spacings between the crosstie strips.

Shown in FIG. 9 is a graph of the characteristic impedance of the proposed slow-wave structure. There is a slight variation in the characteristic impedance of the slow-wave structure as a function of the frequency.

Figure 10:
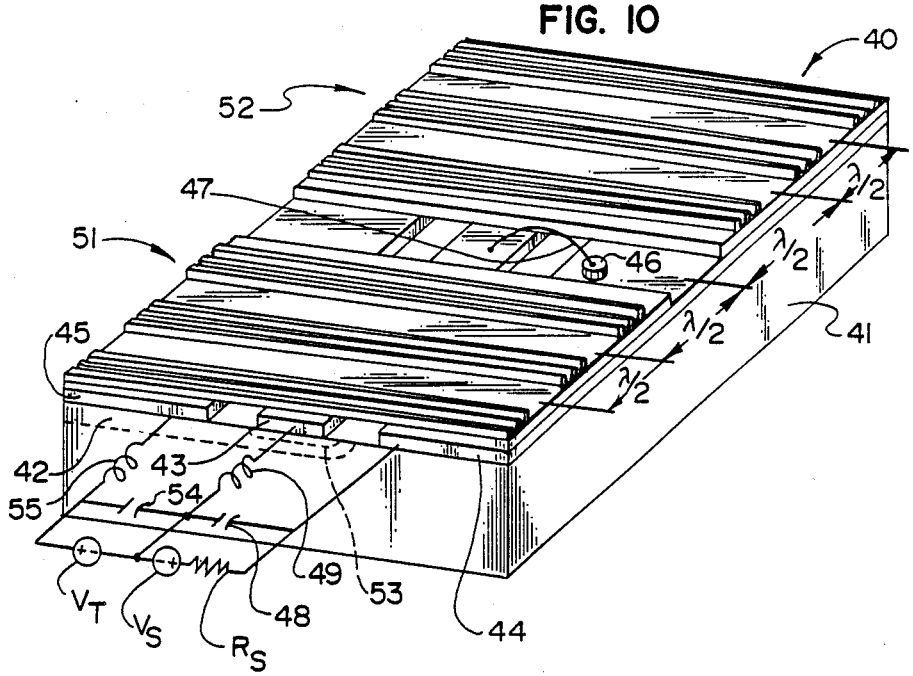
FIG. 10 is a schematic diagram of a Distributed Bragg Reflector Gunn oscillator employing a doubly periodic slow-wave structure and electronic tuning via a Schottky effect.

Turning now to FIG. 10 there is shown a schematic diagram of an electronically tunable Distributed Bragg Reflector Gunn oscilator generally designated 40 which uses a doubly periodic slow-wave structure according to another aspect of the present invention. The oscilator 40 is fabricated upon a substrate 41 of semi-insulating gallium arsenide which has a doped layer 42. An elongated conductive strip 43 is disposed on the substrate 41 and makes a Schottky junction with the doped layer 42. Also disposed on the substrate 41 is a guard strip 44 deposited on a semi-insulating portion of the substrate 41, and a second guard strip 45 making an ohmic contact with the doped layer 42.

In order to generate microwave oscilations, a Gunn diode 46 is surface mounted to an exposed upper surface of the first guard strip 44 and is also connected via a lead 47 that is wire bonded to the elongated strip 43. The Gunn diode 46 is biased by a voltage source $V_s$, and a source resistance $R_s$. In addition, the voltage source $V_s$ and source resistance $R_s$ are isolated at microwave frequencies from the Gunn diode 46 by a shunt compacitor 48 and a choke inductance 49. The source voltage $V_s$ and the source resistance $R_s$ are selected so that the Gunn diode 46 is biased in its negative resistance mode. In this mode, the Gunn diode oscilates at a frequency primarily dependent on the reactance seen by the terminals of the Gunn diode. This reactance would include the inductance of the lead 47 in series with the impedance of the elongated strip 43 at its connection to the lead 47.

In order to stabilize the frequency of oscillation of the Gunn diode 46, there are provided doubly periodic slow-wave structures generally designated 51 and 52 overlapping the opposite end portions of the elongated strip 43. Each of the reflectors 51, 52 has a second period that is approximately a half of a wavelength of the signal propagating on the elongated strip 43. In other words, the reflectors 51, 52 provide discontinuities or changes spaced at intervals along the elongated strip 43. At a particular resonant frequency, the discontinuities appear at half wavelength intervals for propagation along the elongated strip 43 and the reflections constructively interfere so that a substantial portion of the microwave powder is reflected back to the Gunn diode 46.

In order to provide electronic tuning, the slow-wave factor for the reflectors 51, 52 is slightly modulated by a tuning voltage $V_T$ which biases the Schottky junction and therefore slightly displaces the Schottky depletion layer 53. Movement of this depletion layer changes the partitioning of the electric and magnetic fields and in this fashion modulates the slow-wave factor. In order to suppress some self-modulation of the depletion layer 53, the tuning voltage $V_T$ is isolated from the guard band 45 by a capacitor 54 and a choke inductance 55.

One disadvantage with the simple structures 51 and 52 shown for the reflectors is that reflections occur primarily from the first few discontinuities or changes and therefore the bandwidth is broadened and sidelobes appear in the frequency response of the reflectors. This reduction in the quality factor (Q) may cause the oscillation to be unstable and noise is increased. These problems can be solved by using a doubly periodic structure and tapered weighting of the magnitude of the changes in the doubly periodic structure.

Figure 11:
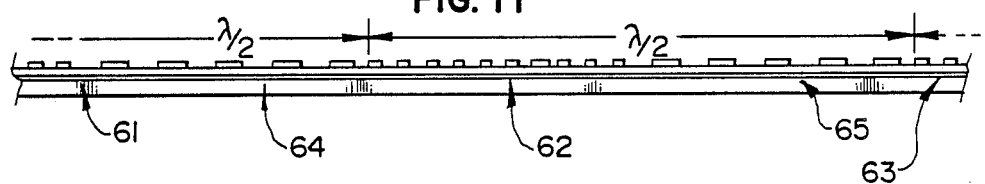
FIG. 11 is a schematic diagram of a doubly periodic slow-wave structure.

A preferred form of doubly periodic structure has alternate adjacent sections of gratings of the crosstie strips in which the adjacent sections have different parameters, for example, different values for $l_A$ and $l_B$. Such a doubly periodic structure is shown in FIG. 11. The structure is comprised of sections 61, 62 and 63 which have similar parameters, and sections 64 and 65 which have a different set of common parameters. By variation of only the length parameter, it is possible to keep the length of each section approximately the same and to weight the reflections by the difference in the length parameters $l_A$, $l_B$ between adjacent sections. The sections 61, 62 and 63, for example, each have ten crosstie strips with $l'=5$ microns and sections 64 and 65 each have five crosstie strips in a length $l'=20$ microns.

Figure 12:
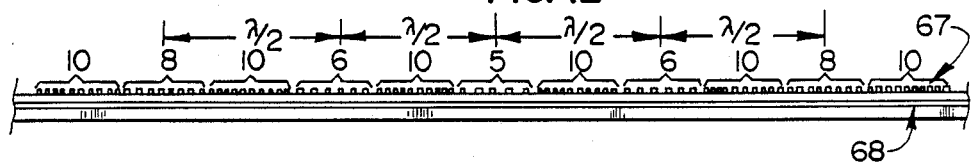
FIG. 12 is a schematic diagram of a doubly periodic slow-wave structure employing tapered weighting.

FIG. 12 shows tapered weighting of the magnitude of the changes in the doubly periodic structure of FIG. 11. The width and spacing of the crosstie strips 67 on the substrate 68 changes at half wavelength intervals. Successive quarter wavelength long gratings of the crosstie strips 67 include in succession 10, 8, 10, 6, 10, 5, 10, 6, 10, 8, and 10 crossties, respectively.

Figure 13:
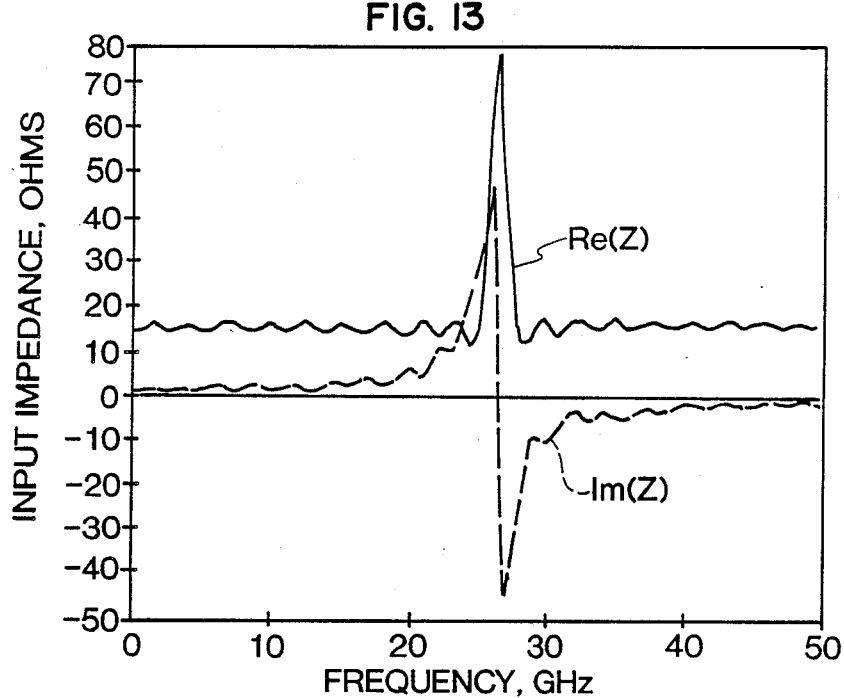
FIG. 13 is a graph of the input impedance seen by a Gunn diode in the resonator of FIG. 10 for a certain doubly periodic slow-wave structure.
Figure 14:
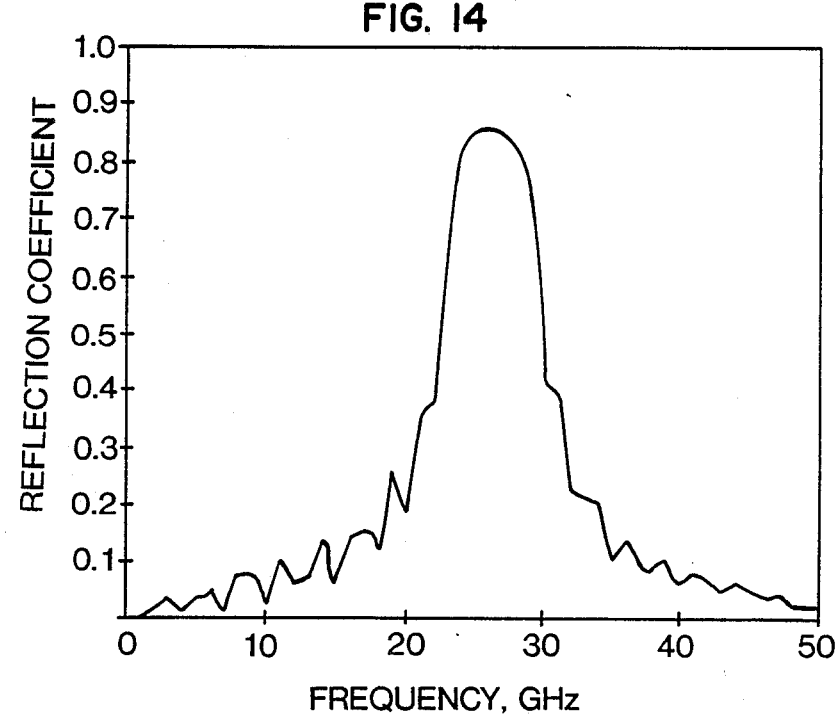
FIG. 14 is a graph of the reflection coefficient as a function of frequency corresponding to the same doubly periodic slow-wave structure producing the input impedance of FIG. 13.

Turning now to FIG. 13 there is shown a graph of the input impedance as a function of frequency that has been computed for a proposed reflector or band-reject grating. This proposed grating includes alternate sections having twenty periods of structures with a length $l'=5$ microns and ten periods of $l'=10$ microns. Two of these different gratings are cascaded together to provide a single period of band-reject grating having a period of 400 microns. One of the gratings 51 or 52 would then be made up of ten periods of band-reject grating, to result in a physical length of 4 mm per grating. Assuming a perameter $w=420$ microns, $a=70$ microns, $b=0.6$ microns and $e_r=4$, the center frequency of the "stop band" for the grating (i.e., the frequency of the maximum reflection) is about 28.1 gigahertz and a peak reflection coefficient of 0.810.

FIG. 13 specifically shows a very sharp resonance at the stop band frequency. The imaginery part of the impedance is inductive for frequencies slightly less than the stop band frequency, and is capacitive for frequences slightly greater than the stop band frequency. The real or resistive part of the input impedance has a sharp peak at the center of the stop band. Therefore, the response of the grating is similar to that of a parallel inductor-capacitor resonant circuit. A significant difference, however, is the appearance of ripple or sidelobes in both the real and imaginary part of the impedance. These ripples are also seen in a graph of calculated reflection coefficient for the proposed grating structure.

Figure 15:
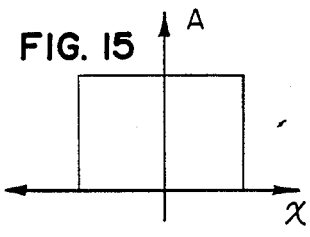
FIG. 15 is a graph of the reflection amplitudes as a function of position for a non-tapered doubly periodic slow-wave reflector.
Figure 16:
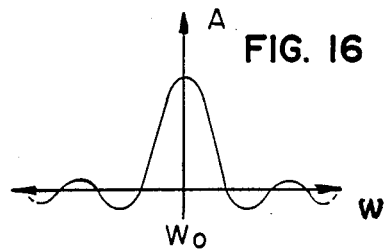
FIG. 16 is a graph of the frequency response for the reflector depicted in FIG. 15.

As illustrated in FIGS. 15 to 18, the ripple or sidelobes observed in the input impedance and reflection coefficient can be reduced by tapered weighting. A graph of the magnitude of the changes as a function of position for a simple grating is shown in FIG. 15. The frequency response, or more particularly the reflection coefficient, is approximately the Fourier transform of the envelope for the magnitude of the changes. Therefore it has the form of the "sinc" function $(\sin(X))/X$. This function has pronounced sidelobes which very slowly decrease at frequencies spaced from the center frequence $w_o$ of the stop band.

Figure 17:
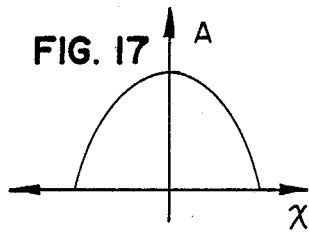
FIG. 17 is a graph of the reflection amplitudes as a function of position for a tapered doubly periodic slow-wave reflector.
Figure 18:
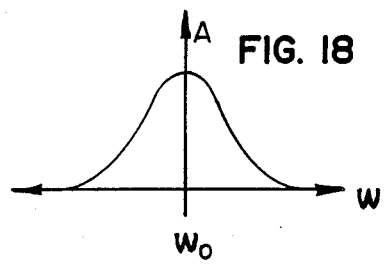
FIG. 18 is a graph of the frequency response for the tapered doubly periodic slow-wave reflector having the reflection amplitudes shown in FIG. 17.

As illustrated in FIGS. 17 and 18, these sidelobes can be eliminated by tapered weighting. FIG. 17 is a graph of the envelope of the magnitude of the changes as a function of position for the tapered weighting of FIG. 12. The envelope is preferably in the form of a cosine or Gaussian pulse. In this case, the Fourier transform, shown in FIG. 18, is a pulse having reduced sidelobes.

Figure 19:
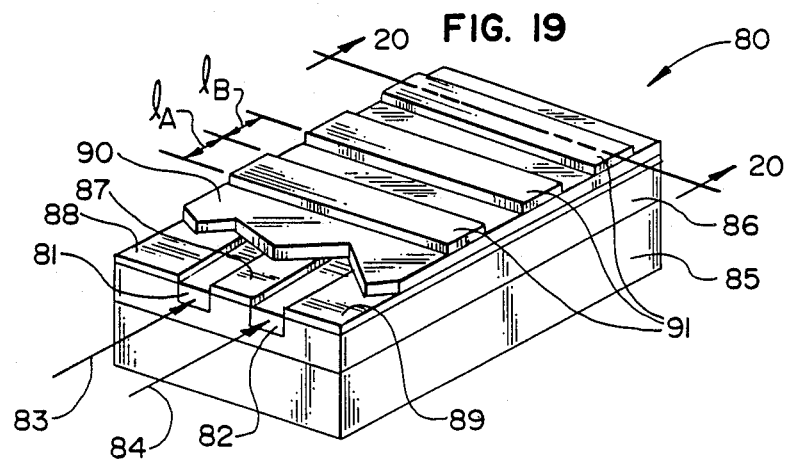
FIG. 19 is a schematic diagram of a monolithic semiconductor optical phase modulator employing the slow-wave structure of the present invention.

Turning now to FIG. 19 there is shown an optical phase modulator generally designated 80 which incorporates a slow-wave structure similar to that shown in FIG. 1 to provide a match between the modulation signal propagation constant and the propagation constant of an optical signal to be phase modulated. If such a match can be made over an appreciable distance, then phase modulation will occur over this extended length. Therefore, a semiconducting material such as gallium arsenide, which has only a relatively modest amount of electrical to optical coupling, can cause full phase modulation of up to 180° over relatively short interaction length. For the design shown in FIG. 19 and further described below, for example, it has been computed that the "frequency-length product" is about 320 GHz-cm, which is about 50 times larger than those of the conventional lithium niobate ($LiNbO_3$) modulator and seven times larger than that of a "phase matched" lithium niobate modulator. Therefore, the modulator 80 shown in FIG. 19 is expected to operate up to a band width 320 GHz for a modulator length of 1 cm.

The optical modulator 80 has a structure similar to the coplanar waveguide structure 25 in FIG. 1, with the addition of optical waveguide channels 81 and 82 which receive respective light beams 83 and 84 to be phase modulated. The modulator 80 includes a semi-insulating gallium arsenide substrate 85. An aluminum gallium arsenide layer 86 is grown on the substrate 85. The gallium arsenide optical channel waveguides are formed in the aluminum gallium arsenide layer 86 by a buried structure technique that is disclosed in K. Saito and R. Ito, I.E.E.E. Journal of Quantum Electronics, QE-16, pp. 205-215, February 1980.

Briefly, such a varied structure technique involves mesa etching of the epitaxial layer 86 to leave strips several mircometers wide for the channels 81 and 82. Then the channels are grown by liquid phase epitaxy using a "growth boat" made of high-purity graphite which is moved over the etched strips to deposit the gallium arsenide optical channels 81 and 82. Such liquid epitaxial growing techniques permit the composition ratio difference enhance the refractive index difference between the gallium arsenide channels 81, 82 and the aluminum gallium arsenide clad 86 to be large enough for high field confinement of the optical beams 83, 84. In particular, the gallium arsenide 83, 84 should have an index of refraction of 3.43, and the aluminum gallium arsenide cladding layer 86 should have an index of refraction of 3.33. The optical channels should have a depth z of 3.0 microns and a width y of 6.5 microns.

An elongated conductive strip 87 is deposited on the cladding layer 86 between the optical channels 81 and 82. Guard strips 88 and 89 are also deposited on the channel layer 86. These three strips, for example, are deposited simultaneously as a single layer of aluminum 3 microns thick and the areas above the optical channels 81 and 82 are etched away using photo-litho graphic techniques. The width s of the elongated strip 87 should be about 6 microns.

After defining the strips 87, 88 and 89, a silicon nitride insulating layer 90 is deposited over the strips 87, 88, 89 and the optical channels 81 and 82. The silicon nitride layer should have a thickness r of about 0.8 microns above the conductive strips. Disposed over the dielectric layer 90 and transverse to the elongated strip 87 is an array of spaced crosstie strips 91. The sections preferably have a length $l_A$ of 2 microns and a length $l_B$ of 17 microns.

These design perameters were choosen to achieve electrical impedance of 50 ohms and for matching the effective index of the modulation signal with the light waves. Additional design considerations were included for high modulation efficiency, low conductor loss and realizable dimensions. High field intensity can be achieved by the minimum realizable electrode gap while low current density requires thick and wide electrodes. Since the applied electric fields in the sections A and B are mostly concentrated in dielectric and substrate layers, the length ratio between the two sections ($l_B/l_A$) was increased in order to achieve the high effective overlap between the applied field and the optical mode. The one period length ($l_A+l_B$) for a fixed ratio ($l_B/l_A$) effects only the band width and is limited by the minimum achievable feature size of electrodes. Silicon nitride was choosen for a dielectric material because of its high dielectric constant and high field strength which allow high slow-wave effect and high field operation, respectively.

The optical waveguide was also designed interactively with the electrode design to enhance the field efficiency of the modulation wave. The main factors for the optimum design are the effective index, the mode size and the relative alignment to the electrodes. The refractive index difference between the gallium arsenide channels 81 and 82 and the aluminum gallium arsenide clad 86 was made large enough for high field confinement of the optical mode. The mode penetration into the dielectric layers is also quite small due to the refractive index difference between the dielectric and the gallium arsenide layers. In the optimum design there was a trade off between high field overlap and low coupling loss. Since the minimum electrode gap in the structure is limited by the impedance matching to about 10 microns, the practical ratio between the mode size and the electrode gap lies around 0.7. Therefore, the waveguide placed between the electrodes, which uses a horizontal component of the modulation field, is effective for high field overlap and has low optical loss.

Figure 20:
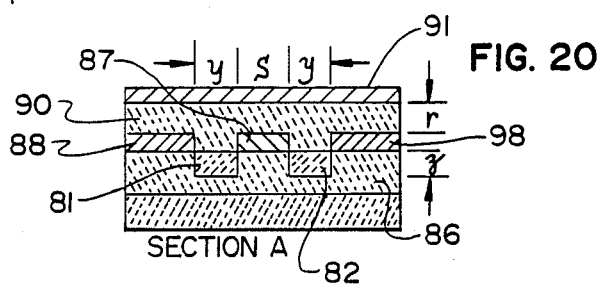
FIG. 20 is a cross-section along line 20—20 in FIG. 19.
Figure 21:
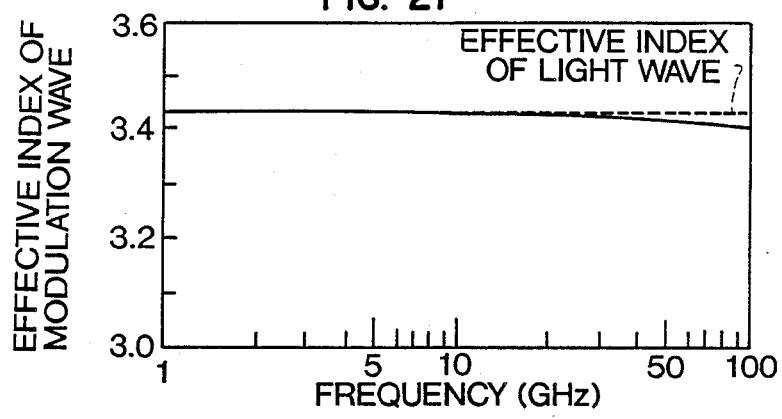
FIG. 21 is a graph of the effective index of the modulation wave and of the light wave as a function of frequency for the optical phase modulator of FIG. 19.

Turning now to FIG. 21 there is shown a graph of the computed effective index of modulation wave as a function of frequency and also the effective index of the light wave as a function of frequency. It should be apparent that the two effective indexes are very well matched at least to about 20 gigahertz. This matching was achieved by designing the two sections A and B of the slow-wave structures to be combined to result in 50 ohms impedance and 3.42 refractive index matching the refractive index of the optical channels. For this purpose the section A of the slow-wave structure (as shown in FIG. 20) was designed to have an index of 2.74 and an impedance of 8.1 ohms, and section B of the slow-wave structure was designed to have an index of 2.73 and an impedance of 66 ohms.

Figure 22:
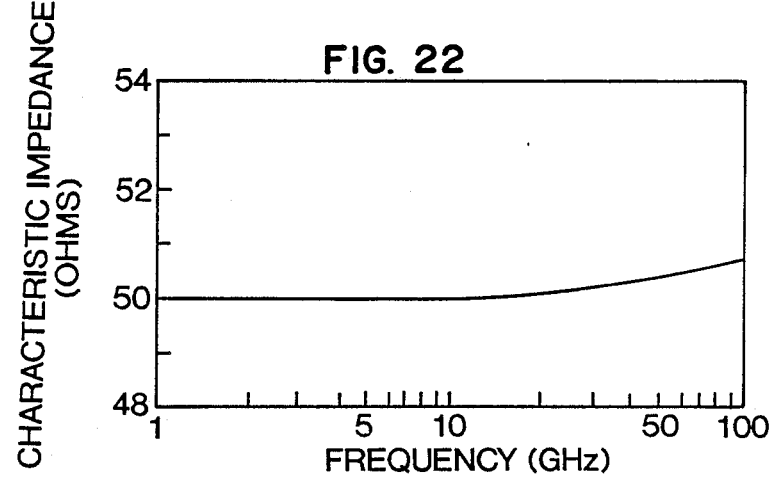
FIG. 22 is a graph of the characteristic impedance as a function of frequency for the slow-wave structure used in the optical phase modulator of FIG. 19.

A graph of the characteristic impedance of the slow-wave structure (80 in FIG. 19) is shown in FIG. 22. It should be apparent that the characteristic impedance is substantially 50 ohms at least up to 10 or 20 gigahertz.

Figure 23:
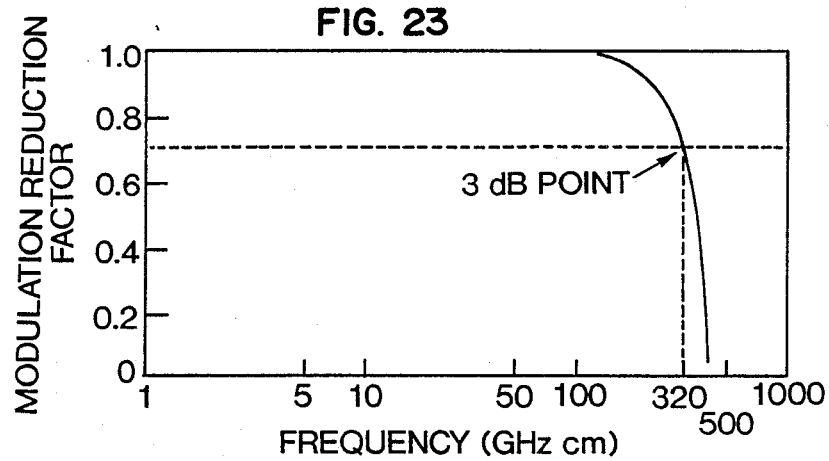
FIG. 23 is a graph of the modulation reduction factor as a function of frequency for the optical phase modulator of FIG. 19.

Shown in FIG. 23 is a graph of the computed modulation reduction factor as a function of frequency which shows the theoretical value of 320 as the frequency-length product at the 3 db phase modulation factor. As noted above, this is a figure of merit of the device which can be compared to other kinds of optical phase modulators. Another figure of merit is the voltage required to obtain a phase shift of 180° in the modulated light beam. For the design shown in FIG. 19 and described above, the theoretical value for this figure of merit is 10 volts at 1 gegahertz.

Further details regarding the design of the optical modulator shown in FIG. 19 have been published by H. Y. Lee, T. H. Wang, and T. Itoh, "Crosstie Overlay Slow-wave Structure For Broadband Traveling-Wave Type Electro-Optical Modulators," International Journal and Infrared and Milimeter Waves, Vol. 9, No. 1, 1988, pp. 87-99.

In view of the above there has been described a slow-wave structure for monolithic microwave integrated circuits that is well adapted to integrated circuit fabrication methods and also permits a wide range of functions to be performed. The structure facilitates coupling between the slow-wave structure and its semiconductor substrate in cases where such coupling is desired, for example, to provide a microwave oscillator having electronic tuning via the Schottky effect, and to provide a traveling-wave electro-optical modulator.

I claim:

1. A periodic slow-wave transmission structure for miniature monolithic circuit elements operable at a microwave frequency, said transmission structure comprising, in combination, a substrate of semiconductor material having a planar upper surface, an elongated conductive metal strip deposited on the planar upper surface of said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency.

2. The transmission structure as claimed in claim 1, wherein said strip portions are electrically isolated from each other.

3. The transmission structure as claimed in claim 1, where said strip portions are electrically connected to each other.

4. The transmission structure as claimed in claim 3, wherein a metal film layer is disposed over said insulating layer, and said strip portions are integral portions of said metal film layer disposed over said insulating layer.

5. The transmission structure as claimed in claim 1, wherein said strip portions are approximately perpendicular to said elongated conductive strip.

6. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, further comprising a pair of conductive guard bands disposed between said substrate and said insulating layer on opposite sides of said elongated conductive strip, said guard bands being spaced from said elongated conductive strip.

7. The transmission structure as claimed in claim 1, wherein said substrate is made of gallium arsenide.

8. The transmission structure as claimed in claim 1, wherein said strip portions are periodically spaced.

9. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, wherein said strip portions are periodically spaced at intervals much smaller than said free-space wavelength, and the sequence of the strip portions has changes at intervals on the order of a wavelength of a signal at said microwave frequency propagating on said elongated conductive strip.

10. The transmission structure as claimed in claim 9, wherein said changes occur at intervals of a half wavelength of a signal at said microwave frequency propagating on said elongated conductive strip.

11. The transmission structure as claimed in claim 10, wherein said changes are changes in the amount of spacing between adjacent ones of said conductive strip portions.

12. The transmission structure as claimed in claim 10, wherein said changes are changes in the width of said conductive strip portions.

13. The transmission structure as claimed in claim 9, wherein the magnitudes of said changes are weight tapered to reduce sidelobes in the frequency response for signal propagation on said elongated conductive strip.

14. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, wherein the spacing of said strip portions is doubly periodic, having a lower period on the order of a wavelength of a signal at said microwave frequency propagating on said elongated conductive strip.

15. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, and further comprising an optical waveguide aligned adjacent to said elongated conductive strip.

16. The transmission structure as claimed in claim 15, wherein said substrate is made of gallium arsenide and said optical waveguide is a gallium aluminum arsenide region disposed in said substrate.

17. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, wherein said transmission structure includes an optical path aligned adjacent to said elongated conductive strip, said optical path having an optical propagation constant matched to the propagation constant of microwave proportion along said elongated conductive strip.

18. A periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and a plurality of spaced conductive strip portions disposed on said layer of insulating material and aligned over and transverse to said elongated conductive strip, adjacent ones of said conductive strip portions being offset by distances less than a free-space wavelength at said microwave frequency, wherein said elongated conductive strip forms a Schottky junction with said substrate of semiconductive material.

19. A doubly-periodic slow-wave transmission structure for miniature monolithic circuit elements operable at a microwave frequency, said transmission structure comprising, in combination, a substrate of semiconductor material, an elongated conductive strip disposed on said substrate, a layer of insulating material disposed over said strip and said substrate, and an array of spaced conductive strip portions disposed on said layer of insulating material and aligned over and transverse to said elongated conductive strip, said conductive strip portions being periodically spaced at a first period much less than a wavelength of a signal at said microwave frequency propagating on said elongated conductive strip, and said array having a second periodic structure having a second period of about one-quarter to one-half of a wavelength of said signal at said microwave frequency propagating on said elongated conductive strip.

20. A periodic slow-wave transmission structure for a monolithic circuit operating at a microwave frequency, said transmission structure comprising, in combination, a substrate of gallium arsenide, an elongated conductive strip disposed on said substrate, at least one optical channel waveguide formed of gallium aluminum arsenide and buried in said substrate, said elongated conductive strip being aligned alongside said optical channel waveguide, an insulating layer disposed over said substrate and said elongated conductive strip, and an array of periodically spaced conductive strip portions disposed on said layer of insulating material and aligned over and transverse to said elongated conductive strip, wherein said optical channel waveguide has an optical propagation constant matching the propagation constant of microwave propagation along said elongated conductive strip.

* * * * *

UNITED STATES PATENT AND TRADEMARK OFFICE
CERTIFICATE OF CORRECTION

PATENT NO. : 4,914,407
DATED : April 3, 1990
INVENTOR(S) : Tatsuo Itoh

It is certified that error appears in the above-identified patent and that said Letters Patent is hereby corrected as shown below:

In Col. 1, line 36, please change "period" to --periodic--.
In Col. 2, line 63, please change "structure" to --structural--.
In Col. 3, line 27, please change "structure" to --substrate--.
In Col. 4, line 46, please change "convering" to --covering--.
In Col. 14, Ln. 14, please change "proportion" to --propogation--.

Signed and Sealed this

Thirtieth Day of July, 1991

Attest:

HARRY F. MANBECK, JR.

*Attesting Officer*  *Commissioner of Patents and Trademarks*